Feb. 4, 1969     A. B. CISTOLA     3,426,248

PLANAR VISUAL READOUT DISPLAY DEVICES

Filed March 17, 1966

INVENTOR
ANTHONY B. CISTOLA

BY *Norman R. Bardales*

ATTORNEY

United States Patent Office 3,426,248
Patented Feb. 4, 1969

3,426,248
PLANAR VISUAL READOUT DISPLAY DEVICES
Anthony B. Cistola, Vestal, N.Y., assignor to International Business Machines Corporation, Armonk, N.Y., a corporation of New York
Filed Mar. 17, 1966, Ser. No. 535,097
U.S. Cl. 315—169        10 Claims
Int. Cl. H05b 41/02

ABSTRACT OF THE DISCLOSURE

A visual composite character display device in which an electric conductive pattern is arranged in a set of co-planar lines, and a member is placed in contacting and covering relationship with the conductive pattern. The member is provided with openings to expose the electrical conductive pattern at those portions of the lines which define the elements of the particular characters of the device.

---

This invention relates to display devices and more particularly to display devices of the type such as those described in my previous patent application, Ser. No. 815,612, filed May 25, 1959, entitled, "Display Device," and which is now U.S. Patent No. 3,041,491, issued June 26, 1962.

In the aforesaid patent, there is described display devices of the visual readout type wherein selected characters are displayed in a single viewing area and the characters are formed compositely from sets of thin parallel line character forming members by energization of a selected character set. In one embodiment, the character line forming members are in the form of thin parallel conductive plates. The viewing or front edge of each plate is adapted to form a preselected character line of the particular character which is defined by the set containing the plate. To accomplish this, the front edge of the plate is recessed exclusively from the rest of the body of the plate at one or more predetermined parts. As a result, the front edge of the plate is comprised of recessed and non-recessed or protruding parts, the latter providing the character forming element(s) or portion(s) of the character line. In some cases a particular line of a character is contiguous for the entire front edge of the plate. However, in general, most lines will be composed of one or more recessed parts. The plates associated with each character set are interleaved with the plates of the other sets and and the plates are insulated with respect to each other except at those parts, i.e. the protruding parts, of their respective front edges which form the character forming portions. The plates are horizontally assembled, one on top of each other with the foremost or protruding parts of the front edges aligned. As a result, all the front edge non-recessed or protruding parts, which as aforementioned form the character forming elements or portions, of each and every set are substantially and exclusively co-planar and are adapted to be viewed by the observer in this position. Furthermore, those front edge parts, which do not form the character forming portions, are not in a co-planar relationship with the parts which do not form such portions.

In an alternative embodiment described in the aforesaid patent, the sets of character forming members are made as grids. Each grid represents a selected character and comprises a number of spaced parallel conductive bars which are supported by a frame-like plate. The front edge of each bar, which is in parallel relationship with the plane of the plate, is adapted to form one or more separate character forming portions of a line of the selected character. To accomplish this in the particular embodiment described in the aforesaid patent, the front edge of the bar is recessed at those part or parts which act as the character forming portion or portions of the character line. The plates are insulated except at the recessed parts of the bars and are stacked side by side in a vertical position so that the planes of the plates are parallel to each other and normal to the observer's line of sight. The bars of each plate are spaced so that a bar from each successive adjacent plate is aligned and visible therebetween. As a result, the front edge of each of the bars faces toward the viewing plane of the device. In this embodiment, only the front edge recessed parts of the bars of the set to which it belongs are substantially and exclusively co-planar. The adjacent set, however, and its associated front edge recesed parts are in a different exclusive co-planar relationship. Those front edge parts, which comprise the non-recessed parts of a given set and which are not character forming portions of the character line, are not in co-planar relationship with the parts, i.e. the recessed parts, which do form such portions. Similarly, in those cases where the entire front edge of a bar of a given set is recessed to form a so desired character line such an edge will be placed in substantial co-planar relationship with the recessed front edge parts of other bars of the same set. For further details concerning the previously described devices, the reader is referred to the aforesaid patent.

The above described embodiment has generally been found to be simple, compact and satisfactory. However, because of their particular configurations, in certain applications having limited space requirements, even their compact physical dimensions are inadequate. For example, in the embodiment employing the front edges of the horizontally stacked plates as the character forming lines, for a given frontal height, the number of composite characters that can be displayed is limited by the number and thickness of the individual plates utilized. Furthermore, for those applications where space requirements are critical, the depth of the device, i.e. the dimension normal to the viewing plane of the device, may be objectionable due to the preselected and substantial length required for the side edges of the plates. In addition, each plate of a set is provided with a lug tab, the lug tabs of the plates of a set being aligned when the latter are assembled, and connected to a common conductor which in turn is connected to a terminal prong or pin which is associated with the set. The aligned lugs of each set are disposed about the side and back edges of the stacked plates and thereby increase the overall width and/or depth dimensions of the device. In the other described embodiment employing vertically stacked plates for a given frontal height, the number of composite characters that can be displayed is limited by the height of and spacing between the bars and, as mentioned in the aforesaid patent, this embodiment is best suited for the displaying of five or less characters. To provide more characters for a given plate thickness and bar height, the spacing between bars must be increased accordingly thereby increasing the overall frontal height of the device as well as the overall depth of the device due to the addition of the extra desired number of characters and associatesd plates. In addition, while the construction and assembly of the embodiments of my previously described patent are much simpler and less expensive than other similar kinds of prior art devices, a need for an even more simple and compact constructed and inexpensive device is required to meet the demands of today's technical requirements.

The object of this invention is to provide a composite character display device which is easily constructed and/or assembled and relatively inexpensive.

Another object of this invention is to provide a composite character display device which is compact, rugged and simple.

Still other objects of this invention are to provide a character display device which is readily fabricated as electroluminescent, glow discharge, incandescent or other type devices and is particularly adaptable to printed circuit techniques.

Accordingly, the composite character display device of the present invention comprises composite character defining and forming means which are arranged in a viewing plane in substantially co-planar spaced lines. The character defining and forming means are furthermore arranged in separate character sets with at least one of the lines in a given set being adjacent to the lines of another set. A predetermined length of each line forms at least one character forming element or portion of the character defined by the set with which it is associated. Electrical means are provided for simultaneously energizing all of the composite character forming and defining means associated with each set, the sets being adapted to be energized in a selective manner. In addition, the device has means which provide a visible display of the character forming portions or elements of the lines of the particular character set which are so energized. The character forming portions of the lines are arranged in substantially co-planar relationship with the portions that are not character forming elements. As a consequence, the device is considerably compacted as will become apparent hereinafter.

The foregoing and other objects, features and advantages of the invention will be apparent from the following more particular description of preferred embodiments of the invention, as illustrated in the accompanying drawings in which.

In the figures, like elements are designated with similar reference numbers.

Figure 1:
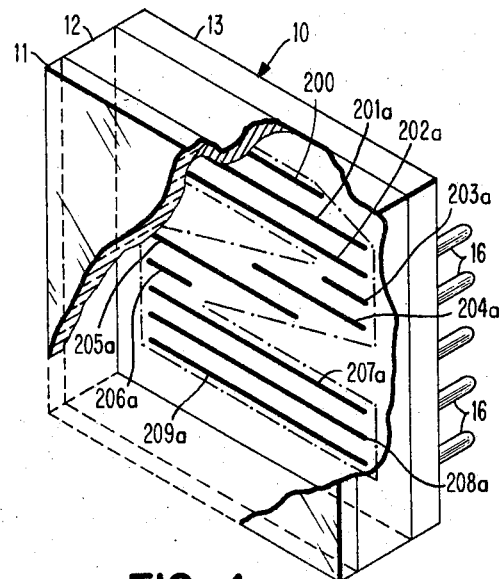
FIG. 1 is a perspective view, partially broken away, of an embodiment of the present invention.

In the embodiment illustrated in FIG. 1, the display device 10 is fabricated for purposes of explanation as a gas or glow discharge device and comprises a transparent viewing member 11, a ceramic rectangular tube-like member 12 and an end member 13. The end member 13 carries a composite character pattern such as, for example, the composite pattern shown in FIG. 4. For sake of clarity, the individual character pattern, which is associated with the numerical character 2, is illustrated in FIG. 1 as being energized. It should be understood, however, that the character defining elements, illustrated by the reference numerals 200a–209a of character pattern 2, are interleaved and integrated with the elements of the other individual character patterns such as those illustrated, for example, in FIGS. 3b to 3j so as to form the composite character pattern of FIG. 4.

Figures 3A, 3B:
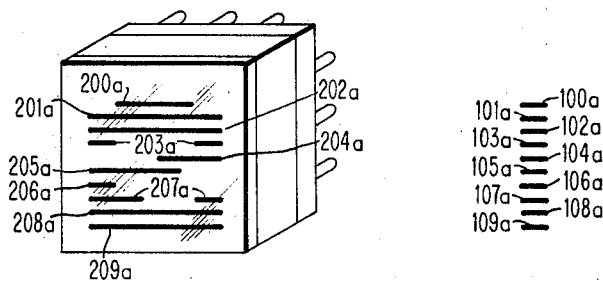
FIGS. 3a–3k are generally schematic views which illustrate, by way of example, various individual character patterns which may be utilized in the present invention.
Figures 3C, 3D, 3E:
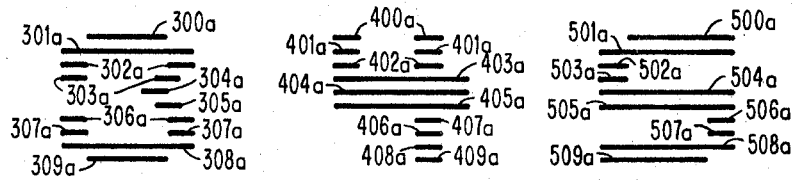
Figures 3F, 3G, 3H:
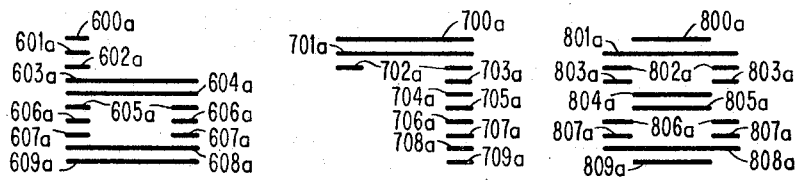
Figures 3I, 3J, 3K:
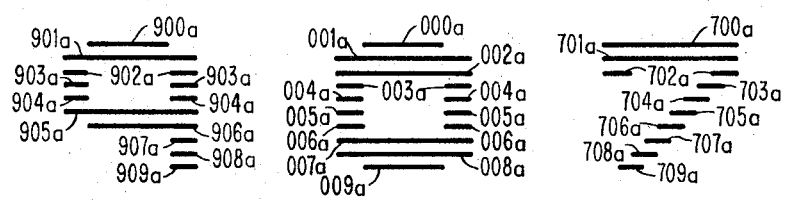
Figure 4:
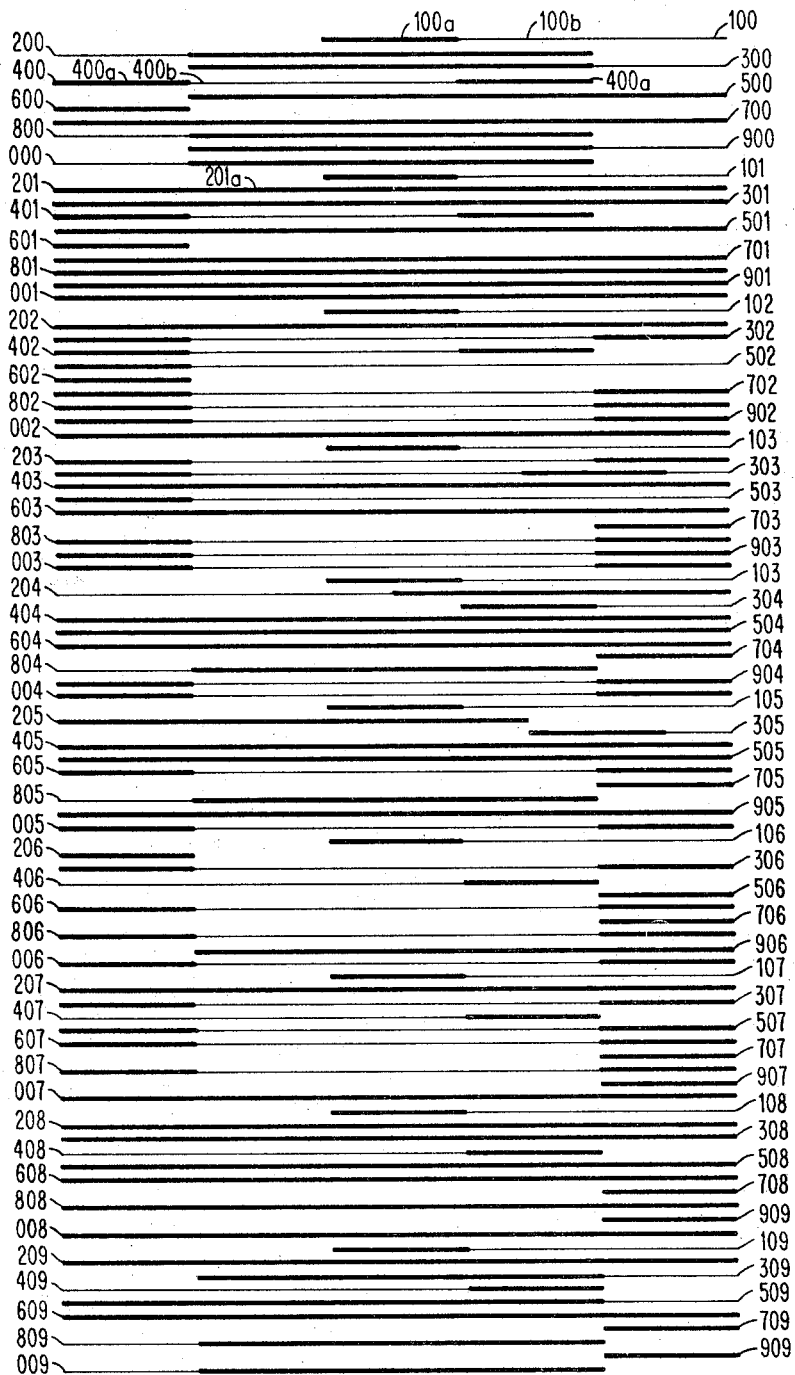
FIG. 4 is an enlarged schematic view of the composite character pattern formed by integrating the individual character patterns illustrated in FIGS. 3a–3j.

As shown schematically in FIGS. 3 and 4 in greater detail, each of the individual character patterns illustrated in FIGS. 3a to 3j is composed of a set of ten parallel lines, hereinafter referred to as a character line, such as for example, the ten parallel character lines 100–109, FIG. 4, which are associated with the numerical character 1, FIG. 3b. Each character line has a predetermined length, or lengths as the case may be, which is a character defining element, or elements, of the character with which it is associated. For example, the character line 100, FIG. 4, has a predetermined length illustrated in the drawing by the reference number 100a which forms the top horizontal character defining element of the numerical character 1 shown in FIG. 3b. Similarly, the character line 400, FIG. 4, has two predetermined lengths 400a, which form the top horizontal elements of the numerical character 4 shown in FIG. 3d. In character line 201, its entire length 201a forms the second element of the numerical character 2 shown in FIG. 3a. As will become apparent hereinafter, the lengths of the character lines which represent the individual elements of the various associated characters as well as the lengths, e.g. length 100b, FIG. 4, of line 100 which do not form elements of the characters, are substantially co-planar. The character lines of these individual character patterns are interleaved so as to form the composite character pattern of FIG. 4. As can be seen from FIG. 4, the character lines appear in the sequence 100, 200, 300, 400 . . . 800, 900, 000, 101, 201, 301 . . . 809, 909, 009. For the sake of clarity, the character defining elements, e.g. element 100a, and the non-defining elements, e.g. element 100b, are illustrated in FIG. 4 by the heavier and lighter portions, respectively, of their associated character line, e.g. line 100. As will become apparent hereinafter, while the conductive members which constitute these elements could actually be fabricated with such a configuration and especially where printed circuit techniques are employed, in practice the conductive members will generally, but not necessarily, have a uniform width for both element types, the non-defining elements being adapted to have no adverse viewing effects when the character set with which it is associated is energized as will become apparent hereinafter.

Figure 2:
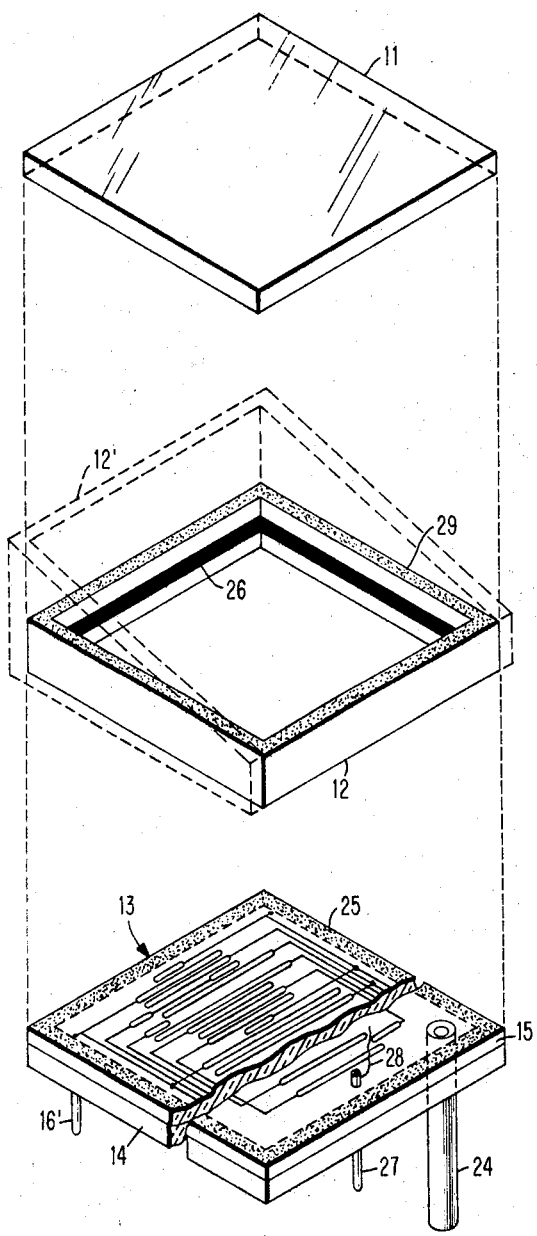
FIG. 2 is a perspective and exploded view of the embodiment of FIG. 1 and wherein the composite character pattern is illustrated in an exaggerated form and in a partial and broken away manner for sake of clarity.
Figure 6:
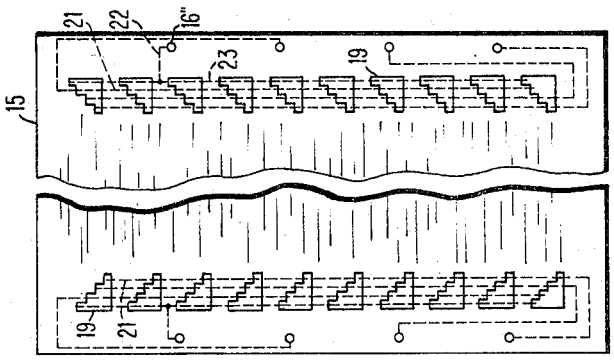
FIG. 6 is an enlarged view of the sub-member 15, partially broken away, illustrated in FIG. 5.
Figure 5:
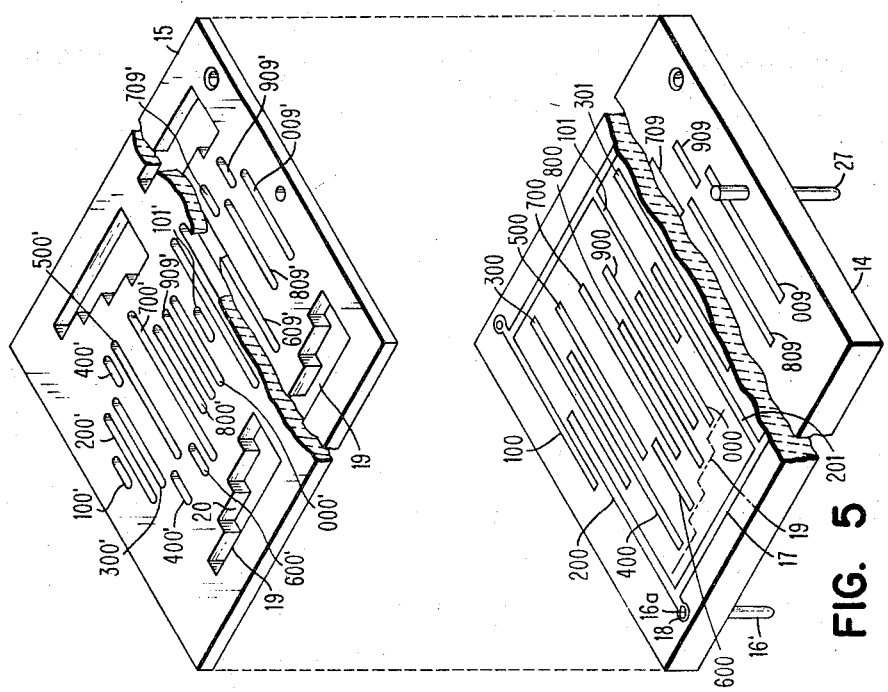
FIG. 5 is an enlarged perspective and exploded view, partially broken away, of the lower member 13 illustrated in FIG. 2.

Turning now to FIGS. 2, 5 and 6, the end member 13 of the device 10 comprises a ceramic substrate or base 14 and a member or layer 15. Conductors are printed on the upper surface of the base 14, cf. FIG. 5, in a conducting pattern which is compatible to the character pattern of FIG. 4. These conductors define the character lines 100, 200, etc. and are preferably formed on the ceramic member or base 14 by a silk screen process in a manner well known to those skilled in the printed circuit art. The upper surface of the base 14 and the conducting pattern it carries is covered by a glass sub-member or layer 15. Openings 100', 200', etc. are provided in the glass layer 15 and each opening exposes a portion of an underlying conductor formed on the base 14 and with which it is in register. These openings coact with the underlying exposed conductors or portion(s) thereof to provide the individual character defining elements, e.g. element 100a, of the composite character pattern illustrated in FIG. 4. The glass layer is preferably applied in the form of powdered glass mixed with a non-carbonizing oil in a viscous state and is applied on the top surface of the base 14 as well as the conductive pattern carried thereby. The assembly is then heat treated by a firing process to melt the mixture so that upon cooling it is formed into the contiguous glass layer 15 with the openings, the latter being formed by a silk screen technique.

A common connection is made of the ten character lines associated with each character set to one of the assocoated terminal pins 16, FIG. 1. For example, each of the conductors which form the character lines 200, 201 . . . 209 and which are associated with the numerical character 2 are commonly connected by a printed circuit conductor 17, FIG. 5, which is formed as part of the conducting pattern produced on the substrate 14. The terminal prong or pin 16′, FIG. 5, which is embedded along a part of its side in the ceramic base 14 is connected to the printed circuit conductor element 18 which is formed as part of conductor 17. A similar connection arrangement is produced for character line conductors, i.e. 100, 101, etc., related to the numerical character 1 and its associated pin, not shown, on the opposite side of the substrate 14, FIG. 5. In order to minimize the number of crossovers between the common conductors which interconnect the pins to their respective sets of character line conductors, the character line conductors are illustrated as being arranged into two groups, cf. FIG. 4. One group comprises all the conductors associated with the even number characters 2, 4, 6, 8, 0 and the other group comprises the conductors associated with the odd number characters 1, 3, 5, 7, 9. The lefthand ends of the first mentioned group are extended outwardly in a staggered arrangement, as illustrated in FIG. 5 by the inverted staircase dash line 19; and such that all the extended ends of the character line conductors associated with a particular character set will be in a common exclusive alignment with respect to each other. For example, lefthand ends of the conductors 200, 201 . . . 209 are outwardly extended in a common alignment with respect to each other. Similarly, the lefthand ends of the conductors of the next even number character set, e.g. conductors 400, 401 . . . 409 are extended and in a common alignment with respect to each other, and so on for the other even number conductors, with the ends of each set being offset from the ends of the other sets in a staggered or staircase manner, as aforementioned. A similar disposition in the second mentioned group occurs for the righthand ends of the character line conductor associated with the odd number characters. A plurality of aligned staircase-like openings, such as for example, the opening 19, is provided in layer 15 and are disposed on each side of the remaining character lines which are not associated with the numerical characters 1 and 2. The openings, such as opening 19, have a side 20 which is staircase in form and which is compatible to the staggered offset arrangement provided for the respective lefthand or right extremities of the conductors of base 14 associated with the numerical characters 3 to 9 and 0. The openings, such as opening 19, may be formed at the same time and in the same manner, the other openings, such as opening 100′, etc., are formed. The glass layer 15 has each of the stairs formed by the side 20 of the opening 19 placed in register with an exposed extremity of a particular character line conductor. Only four such stairs are required in each opening as the conductor elements for the first two connections associated with the sets of numerical characters 1 and 2 have been connected by conductors, e.g. conductor 17, printed on the base 14, as aforementioned. With the glass layer 15 covering the conductor character elements of the base 14, a printed circuit conductor pattern indicated by the dash lines 21, FIG. 6, is provided to make the interconnections to each character set to its associated pin. Under these circumstances, these pins, as well as being embedded in the base 14, are extended further upward and through the layer 15 and connected to the common connector element of the character with which it is associated. For example, the conductor 22 interconnects the common conductor 23, FIG. 6, with the pin 16″ illustrated therein to the conductors comprising character lines 300, 301 . . . 309 located on the base 14. The interconnection circuit pattern 21, as well as the exposed portions of the pin 16 and the exposed end portions of the lefthand and righthand, character line conductors, after connection has been effectuated, are covered with a suitable insulator.

During the assembly of the device 10, an evacuation stem 24, FIG. 2, is provided and is subsequently removed in a manner and for purposes well known to those skilled in the art. The ceramic tube-like member 12 is affixed to the layer 15 by a suitable sealing compound 25, FIG. 2, such as glass frit. An anode conductor 26, which is printed on the inner walls of the member 12, is connected to the anode pin 27 by conductor 28. The transparent member 11, in turn, is affixed to the member 12 by use of a suitable compound 29 which may be similar to the compound 25. In operation, the pins 16 of the device 10, FIG. 1, would be selectively energized with the anode pin 27 such that the character line conductors associated with a given character set would be actuated. As a result, the gas in the proximity of the exposed character defining elements, which are associated with the particular character line conductors so energized, is ionized and provides a visible or luminous display of the associated character.

If desired, the device 10 may be provided with a light shield, shown in phantom outline in FIG. 2 as a separate member 12′ affixed by cement or other means to the member 12, or alternatively it may be formed as an integral part of the member 12 by tapering the top edges of the appropriate sides and affixing the glass member 11 thereto.

Figure 7:
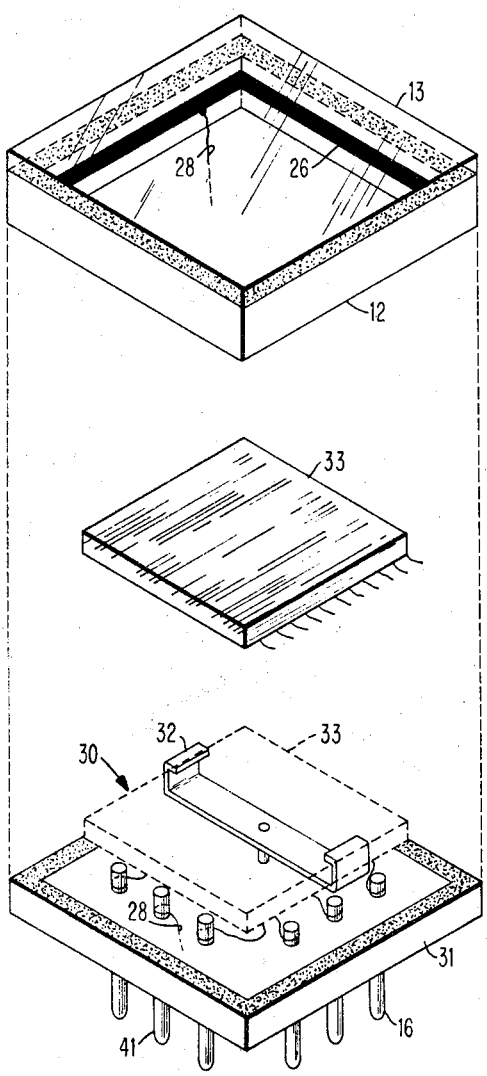
FIG. 7 is an exploded view of another embodiment of the invention.
Figure 8:
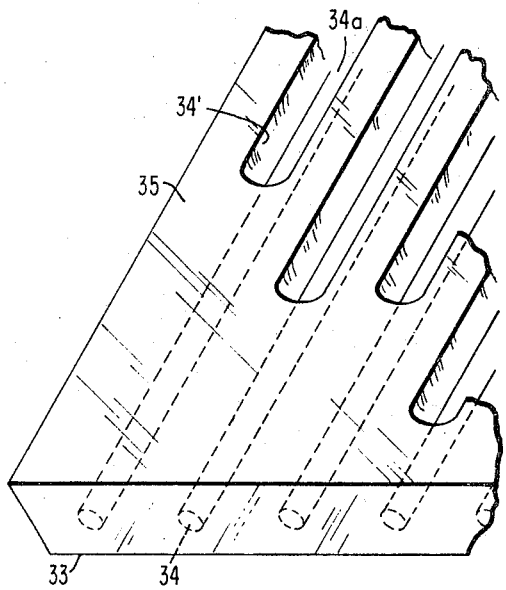
FIG. 8 is an enlarged partial perspective view of the top of the member 33 illustrated in FIG. 7.
Figure 9:
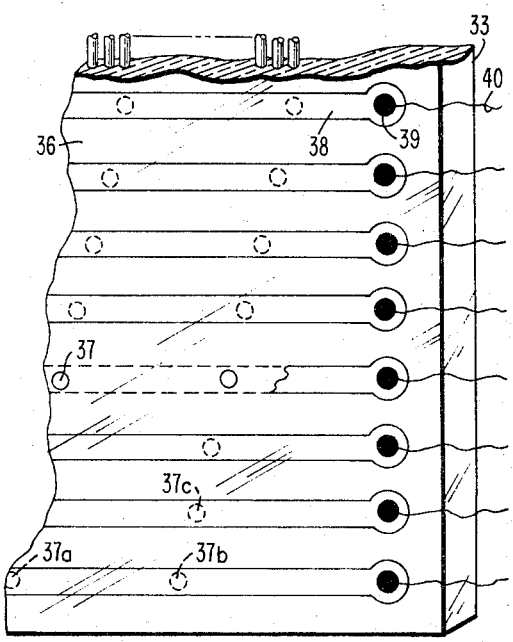
FIG. 9 is an enlarged partial perspective view of the bottom of the member 33 illustrated in FIG. 7.

Turning now to the embodiment of FIG. 7, there is shown an alternative embodiment for the end member 13 of FIG. 1. Accordingly, the end member, designated by the reference numeral 30 in FIG. 7, comprises a ceramic base member 31 having protruding terminal prongs or pins 16 embedded therein. A raised bracket 32 is mounted on the base member 31 and is adapted to support member 33 as indicated by the phantom outline thereof in FIG. 7. Member 33 is composed of a transparent insulator such as glass and has embedded therein parallel electrical conductors, e.g. conductor 34, FIG. 8, which form the interleaved character lines of a composite character pattern such as the one illustrated in FIG. 4. As shown in FIG. 8, the lefthand ends of the embedded conductors are extended and in common alignment. A similar disposition of the righthand ends, not shown, of the embedded conductors is provided. The top surface 35 of member 33, cf. FIG. 8, is provided with openings, e.g. opening 34′, so as to expose parts, e.g. part 34a, of the respective conductors, e.g. conductor 34. The parts so exposed comprise the character forming elements of the character lines of the character pattern. The under surface 36 of the member 33, cf. FIG. 9, is provided with feed-through holes, such as hole 37. A feed-through hole is provided for each of the embedded conductors. The feed-through holes are arranged in parallel horizontal rows as shown in FIG. 9. The rows are perpendicular to the axes of the embedded conductors. Each of the feed-through holes associated with a particular row is exclusively related to one of the conductors which are associated with a given individual character set. As a result, the holes of adjacent rows are arranged in staggered relationship as shown in FIG. 9 and each row is associated with a given character set. As an example, the holes 37a and 37b, FIG. 9, are in a row associated with the conductors defining the first numerical character 1 and, more specifically, holes 37a and 37b are associated with the conductors comprising the character forming elements 108, 109, respectively, illustrated in FIG. 4. Likewise, the hole 37c is in a horizontal row associated with the conductors comprising the elements defining the reference character 2 and the hole 37c is specifically aligned with a conductor which corresponds to the element 209, FIG. 4. Conductors, such as conductor 38, FIG. 9, are affixed preferably by printed circuit techniques to the surface 36 across each row of feed-through holes for connection therein to the embedded conductors. Each of the conductors, e.g. conductor 38, is provided with a terminal, e.g. terminal 39, to which a conductor, e.g. wire conductor 40, is connected. The other end of the wire conductor is connected to a particular terminal prong, e.g. pin 16, which is related to the character set of the particular associated row. The device 30 of FIG. 7 has a ceramic rectangular tube-like member 12 with a transparent viewing member 13 sealed thereto. The conductor 28 connects the conductor anode 26 to an anode pin such as, for example, pin 41 of FIG. 7. With the member 33 inserted into the raised bracket 32, the ceramic member 12 is sealed to the base 31. The embodiment illustrated in FIG. 7 is fabricated as a gas discharge device and its operation is similar to that described in the embodiment of FIG. 1, all the inner exposed electrical parts and/or other electrical members or connections except the character forming elements and anode 26 being duly covered with an appropriate insulator means during assembly so as not to cause any adverse viewing effects.

Figure 10:
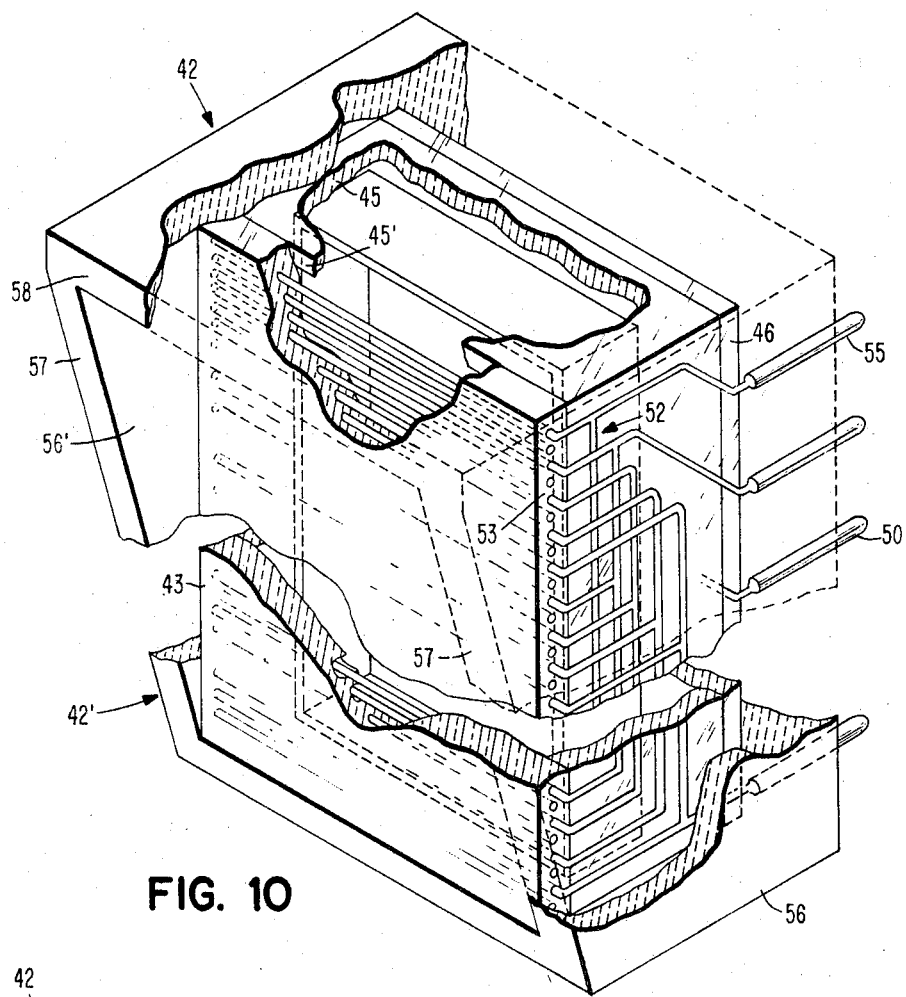
FIG. 10 is a perspective view, partially broken away, illustrating a modified form of the embodiment of FIG. 7.
Figure 12:
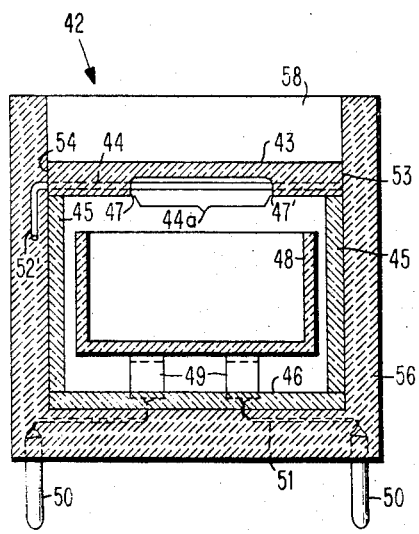
FIG. 12 is a reduced cross-sectional view of the embodiment of FIG. 10 taken along the line 12—12, FIG. 11.
Figure 11:
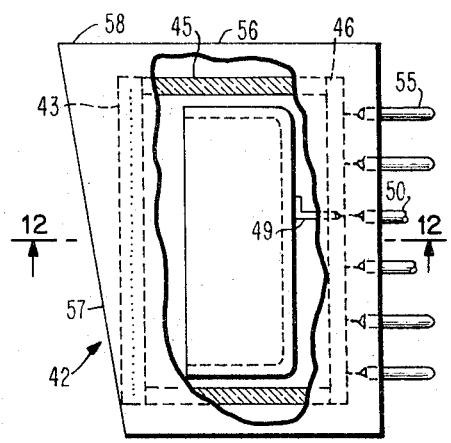
FIG. 11 is a reduced partial schematic side view of the embodiment of FIG. 10 wherein the members 45 and 56 are partially broken away for purposes of explanation.

Alternatively, the embodiment of FIG. 7 may be modified in accordance with the form illustrated in FIGS. 10–12 wherein the display device 42 is again illustrated as a glow discharge device for purposes of explanation. A transparent insulator such as the glass member 43 is illustrated as having embedded therein horizontal parallel conductors, such as conductor 44, FIG. 12, which comprise the character lines of a preselected composite character pattern. The glass member 43 is sealed to the front edges of a rectangular tube-like ceramic member 45, for example, front edge 45′, FIG. 10. A back plate ceramic member 46 is sealed to the back edges of the member 45 such that the members 43, 45, 46 form an evacuated envelope containing an ionizable gas. The inner surface 47, FIG. 12, of the member 43 is provided with suitable openings, such as opening 47′, which coact with the exposed parts, e.g. part 44a, of the embedded conductors, e.g. conductor 44, and which collectively provide the character forming elements of the composite character pattern which has a configuration, for example, compatible to the character pattern of FIG. 4 when viewed in the direction of the arrow 42′ shown in FIG. 10. An anode member 48, shown in the form of a hollow rectangular conductive cup, FIGS. 11, 12, is supported by the pair of brackets 49. The brackets 49, in turn, are embedded in the member 46 and act as terminal connections for connecting the anode member 48 to the anode pin 50 by the conductors 51. The character line conductors embedded in member 43 are interconnected according to the particular character sets with which they are associated. By way of example, in FIG. 10 the interconnections, generally indicated by the reference numeral 52, for the odd numbered characters, 1, 3, 5, 7, 9 are made along the righthand edge 53 fo member 43 and the interconnections, such as for example the interconnection 52′ shown in FIG. 12, for the even numbered characters 2, 4, 6, 8, 0 are made along the lefthand edge 54. The interconnections are preferably insulated wire conductors and are connected to appropriate terminal prongs or pins, such as pin 55, each of which is associated with a given character set. A suitable moldable plastic insulator housing 56 embeds the members 43, 45, 46 as well as the interconnecting conductors and the inwardly disposed portions of the terminal pins. The housing 56 has an opening 56′ for viewing the selected energized character pattern. If desired, the housing 56′ may be provided with tapered edges 57 so as to provide a light shield 58, FIG. 12, along the top thereof. In addition, the inner surfaces of the back plate 46 and anode member 48 may be provided with a suitable color so as to provide a contrasting bcakground for the illuminated character elements, if desired.

Figure 13:
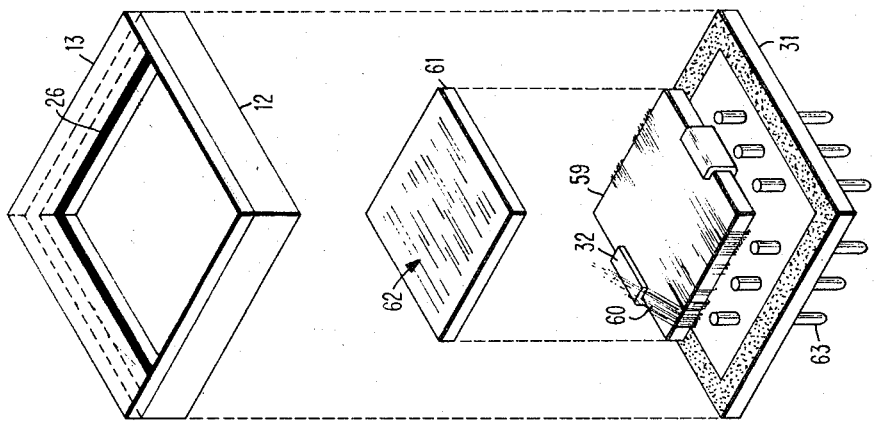
FIG. 13 is an exploded perspective view of still another embodiment of the invention.

In FIG. 13 there is represented another embodiment in which the glass member 33 of FIG. 7 is replaced by a flat ceramic block or member 59 upon which is wound a close-spaced winding comprising multiple spaced wire conductors 60. The conductors 60 provide the character lines for the selected composite character pattern such as, for example, a character pattern which is compatible to the one shown in FIG. 4. For the particular character pattern of FIG. 4, the winding 60 comprises ten wire conductors which are wound as a group ten times around the block 59. On the upper surface of the wire wound ceramic bolck 59, an insulating layer such as glass, shown separately for sake of clarity as the member 61 in FIG. 13, is provided. Openings, schematically shown and generally indicated by the reference number 62, are provided in member 61 which are arranged according to the character defining elements, e.g. element 100a, FIG. 4, of the composite character pattern. Each of the ten wire conductors is connected to its associated character set pin, such as pin 63.

With the wire wound members 59 and 61 mounted in the bracket 32, and with the appropriate interconnections of the character line conductors and pins having been effectuated, members 12 and 13 are provided as before and are assembled together with the base member 31 as a gas discharge device, suitable insulation means, not shown, having been provided for all inner exposed electrical components except the anode 26 and the character forming elements of the character line conductors.

The foregoing embodiments have been described for purposes of explanation as being fabricated as gas discharge devices. It is to be understood however, as is apparent to those skilled in the art, that the invention may be fabricated as other types of display devices such as for example, electroluminescent, incandescent, high vacuum tube, or other types of displays.

As an example, the previously described embodiments may be modified and fabricated as a vacuum tube display in which case the character forming elements, e.g. element 100a, FIG. 4, may be coated with a suitable phosphorescent material. Under these circumstances, the coated elements take the place of the ionizable gas envrionment of the glow discharge embodiments, and together with the associated character line conductors would act as anodes and would be adapted to coact with a suitable common cathode. The cathode would in turn be associated and coact with a filament heater in a manner such as, for example, as is described in my aforementioned patent with respect to the cathode and heater ilustrated in FIG. 4 thereof. Upon electron bombardment from the cathode, the anode character set which is energized will glow and display the related character in the display area of the tube.

If desired, the invention may be fabricated as an electroluminescent display device. For example, the ionizable gas environment of the glow discharge embodiments may be removed and in lieu thereof the character forming elements, e.g. element 100a, FIG. 4, of the composite character pattern are coated with an electroluminescent material. A transparent conductive mesh or screen is provided, for example, as a layer in a manner such as that described in my aforementioned patent in connection with the FIG. 7 thereof and the mesh screen described therein. The screen and the selected character set form the two electrodes for energizing the electroluminescent material coating, electroluminescence taking place in the electroluminescent material in front of the selected set of character lines thereby displaying the selected character.

Figure 14:
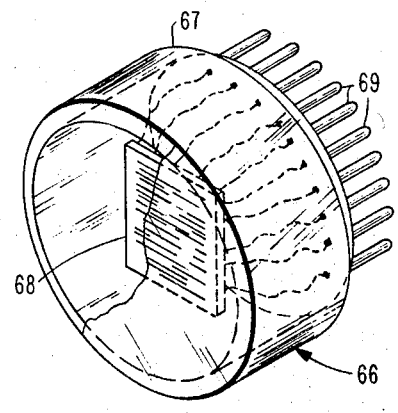
FIG. 14 is a modified form of the embodiments of this invention.

Alternatively, the invention may be fabricated as an incandescent display device such as is the device 66 shown, for example, in FIG. 14. A cylindrical glass envelope 67 has housed therein a base member 68 which comprises a glass layer or member having parallel conductors embedded therein arranged in character sets similar, for example, to the member 33 of FIG. 7 or the wire wound member of FIG. 13. The conductors are of the filament type utilized in incandescent bulbs. However, as is obvious to those skilled in the art, each character set will require two sets of terminal prongs or pins 69 for completing its electrical circuit connection. An insulating layer, not shown, having openings compatible to the character forming elements of each character line conductor is provided on the upper surface of the glass member 68. Thus, when a particular character set is energized an incandescence occurs at the character elements associated with the character set and are so viewed by an observer.

Other types as well as modifications of the foregoing will be readily apparent to those to those skilled in the art. As is obvious, the character forming lines may consist of parallel neon tubes arranged in the composite character pattern and having a suitable opaque coating having transparencies compatible to the character forming elements of the characters lines such that in operation when a particular character set is energized and the gas therein ionized, only the character defining elements will be viewed.

Thus, it can be seen from the foregoing that the present invention provides a compact character display device and in particular where printed circuit techniques are employed. In a device fabricated according to the principles of the present invention and utilizing printed circuit techniques, a spacing of 3.5 mils was provided between adjacent character lines and a width of 3.5 mils was also provided for the character forming lines. While the embodiments are described utilizing a quantity of ten digits for the numerical composite character pattern of the specific configuration illustrated in FIG. 4, it is obvious to those skilled in the art that other composite character configurations or designs utilizing alphabetical and/or numerical and/or other character configurations, as well as different quantities and combinations of individual characters, may be employed. In this regard, FIG. 3k illustrates by way of example, a variation in the design of the individual character configuration of the character number 7 which may be employed. Furthermore, as is obvious to those skilled in the art, while the character lines are illustrated as being linear and in parallel spaced relationship, non-parallel spaced relationship and/or curved character lines may be utilized for, as well as in combination with, those illustrated in the drawings. It should be further understood that while the preferred embodiments are illustrated generally as having symmetrical configurations such as rectangular or cylindrical configurations, other types of configurations as well as asymmetrical configurations may be employed. Thus, while the invention has been particularly shown and described with reference to preferred embodiments thereof, it will be understood by those skilled in the art that the foregoing and other changes in form and details may be made therein without departing from the spirit and scope of the invention.

What is claimed is:
1. A composite character display device comprising:
    a plurality of character defining and forming means disposed in a viewing plane in mutually exclusive sets of lines, said lines being arranged in a substantially coplanar relationship in said viewing plane, each of said sets being associated with a predetermined character, the lines of at least one of said sets being interleaved with the lines of another of said sets, a predetermined length of each line forming at least one element of the character defined by the set with which it is associated,
    electrical means for energizing said sets selectively, and means to provide a visible display of the elements of the lines of any of the energized character sets,
    said character and defining means comprising in combination:
        an electrical conductive pattern arranged in said sets of lines, and
        first member means in contacting and covering relationship with said conductive pattern and having openings therein to expose said electrical conductive pattern at each of said elements of said lines.

2. A composite character display device according to claim 1 wherein said character defining and forming means further comprises a first insulator flat member, said electrical conductive pattern being a plurality of conductor members disposed on said first member and arranged in said sets of lines, said first member means being a second insulator flat member for covering said conductor members, said second member having said openings therein at the elements of said character lines.

3. A composite character display device according to claim 1 wherein said first member means of said character and defining means comprises an insulator flat member having a plurality of conductors embedded therein, said conductors being said electrical conductive pattern and arranged in said sets of lines, and said flat member having said openings therein at the elements of said character lines.

4. A composite character display device according to claim 1 further comprising:
    an envelope having a display area which comprises said viewing plane,
    said electrical conductive pattern of said character and defining means comprising conductive members arranged in said sets of lines within said envelope and in said display area, and said first member means comprising insulator means for covering said conductive members and having said openings therein to expose said conductive members at said character elements, and
    said means to provide a visible display comprising an ionizable gas contained within said envelope, said gas being ionized at the elements of the selected energized character set to provide a visible display thereof in said display area.

5. A composite character display device according to claim 1 further comprising:
    an envelope having a display area which comprises said viewing plane,
    said electrical conductive pattern of said character and defining means comprising conductive members arranged in said sets of lines within said envelope and in said display area, and said first member means comprising insulator means for covering said conductive members and having said openings therein to expose said conductive members at said character elements, and
    said means to provide a visible display comprising an electroluminescent material coating said conductive members at the exposed portions thereof, said electroluminescent material being actuated at the elements of the selected energized character set to provide a visible display thereof in said display area.

6. A composite character display device according to claim 1 further comprising:
    an envelope having a display area which comprises said viewing plane,
    said electrical conductive pattern of said character and defining means comprising conductive members arranged in said sets of lines within said envelope and in said display area and said first member means comprising an opaque insulator means for covering said conductive members and having said openings therein to expose said conductive members at said character elements, and
    said means to provide a visible display comprising said conductive members being composed of an incandescent material, said conductive members of the selected energized character set being placed in an incandescent condition at the elements thereof to provide a visible display in said display area.

7. A composite character display device comprising:
    a plurality of flat conductive members arranged in spaced sets of lines, said lines being arranged in a substantially co-planar relationship in the viewing plane of said device, each of said sets being associated with a predetermined one of the characters of said device, the lines of at least one of said sets being interleaved with the lines of another of said sets, a predetermined length of each line forming at least one element of the character defined by the set with which it is associated, flat insulator member means for supporting said conductive members in said co-planar relationship, means for insulating said conductive members in a covering and contacting relationship, said insulating means having openings to expose the conductive members at their respective associated said elements, electrical means connected to said conductive members and being adapted to energize said character sets selectively, and means to provide a visible display of the elements of said conductive members of any of the energized character sets.

8. A composite character display device according to claim 7 further comprising:

an envelope for housing said conductive members and said supporting member and said insulating means, and wherein said means to provide a visible display comprises an ionizable gas contained within said envelope, said gas being ionized at the elements of the selected energized character set to provide a visible display thereof in said display area.

9. A composite character display device according to claim 7 further comprising:

an envelope for housing said conductive members and said supporting member and said insulating means, and wherein said means to provide a visible display comprises an electroluminescent material coating said conductive members at the exposed portions thereof, said electroluminescent material being actuated at the elements of the selected energized character set to provide a visible display thereof in said display area.

10. A composite character display device according to claim 7 further comprising:

an envelope for housing said conductive members and said supporting member and said insulating means, and wherein said means to provide a visible display comprises said conductive members being composed of an incandescent material, said conductors of the selected energized character set being placed in an incandescent condition at the elements thereof to provide a visible display in said display area.

References Cited

UNITED STATES PATENTS

| | | | |
|---|---|---|---|
| 2,966,616 | 12/1960 | Mash | 315—316 |
| 3,141,093 | 7/1964 | Solomon | 250—213 |
| 3,231,776 | 1/1966 | Britnell | 313—109.5 |
| 3,281,619 | 10/1966 | Greene | 313—108 |
| 3,289,198 | 11/1966 | Dickson et al. | 340—324 |
| 3,290,537 | 12/1966 | Logan | 313—108 |
| 3,302,052 | 1/1967 | Schwab | 313—109.5 |
| 3,320,459 | 5/1967 | Stone | 313—108 |
| 3,323,241 | 6/1967 | Blair et al. | 40—28 |
| 3,327,153 | 6/1967 | Bickmire et al. | 313—109.5 |
| 3,346,759 | 10/1967 | Hardwick | 313—109.5 |

JOHN W. HUCKERT, *Primary Examiner.*

R. SANDLER, *Assistant Examiner.*

U.S. Cl. X.R.

313—108